United States Patent
Berger

(10) Patent No.: US 6,624,627 B2
(45) Date of Patent: Sep. 23, 2003

(54) METHOD FOR INDEXING MAGNETIC DISKS BY USING A SCANNING PROBE

(75) Inventor: Ruediger Friedrich Berger, Heidesheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/108,028

(22) Filed: Mar. 27, 2002

(65) Prior Publication Data

US 2002/0140417 A1 Oct. 3, 2002

(51) Int. Cl.$^7$ .......................... G01R 33/12; G01R 33/10
(52) U.S. Cl. ......................................... 324/212; 360/25
(58) Field of Search ............................. 324/212, 210; 360/25, 27, 31, 53, 51, 75; 369/52.2, 52

(56) References Cited

U.S. PATENT DOCUMENTS 6,281,676 B1 * 8/2001 Ottesen et al. .............. 324/212
6,510,015 B2 * 1/2003 Sacks et al. .................. 360/75

* cited by examiner

Primary Examiner—N. Le
Assistant Examiner—Subhash Zaveri
(74) Attorney, Agent, or Firm—Robert B. Martin; Bracewell & Patterson, L.L.P.

(57) ABSTRACT

A method for indexing magnetic disks by using a scanning probe is disclosed. A magnetic disk includes several essentially concentric magnetic tracks. The magnetic disk is attached to a rotating spindle. A number of data tracks is then written in a specific circular arc at an inner radial position of the magnetic disk. The beginning or the end of the written data tracks is defined to be in a co-incident or in a defined relation to an index or trigger signal defined by the rotating spindle. The rotating spindle is stopped from rotation, and a scanning probe microscope is moved radially at a fixed rotating angle to a second radial position. A tip of the scanning probe microscope is moved towards a surface of the magnetic disk. At least one scan line is recorded and analyzed in order to determine if a magnetic track is imaged by the tip of the scanning probe microscope.

11 Claims, 7 Drawing Sheets

METHOD FOR INDEXING MAGNETIC DISKS BY USING A SCANNING PROBE

RELATED PATENT APPLICATION

The present patent application is related to copending application U.S. Ser. No. 10/005,946, filed on Dec. 4, 2001.

BACKGROUND OF THE INVENTION

1. Technical Field

The present invention relates to direct access storage devices in general, and in particular to magnetic storage devices. Stills more particularly, the present invention relates to a method for indexing magnetic disks by means of a scanning probe.

2. Description of Related Art

Severe performance problems on magnetic storage media may be caused by mechanical/magnetic defects, thickness variations of layering sequence or variations in magnetic coupling in or on top of the magnetic layers in the nanometer range of the magnetic storage media. Hence, certain techniques that enable the mapping of surface and magnetic properties of those critical areas (or areas of interest) with a very high spatial resolution are required. In addition, those techniques should be applicable in-situ in order to detect and characterize the cause of failures. Furthermore, those techniques should be incorporated within a test routine that allows critical areas to be characterized in a relatively short time frame.

One prior art approach for imaging hard disk defects is by characterizing a hard disk on a spin test stand (STS). With such approach, the magnetic and/or topographic properties of a spinning hard disk is analyzed by using test heads such as read write heads that are commonly used in hard disk drives. Some test heads may be specifically designed for test procedures that feature higher resolution, bandwidth, or cover larger tested areas. Defects on a nanometer scale detected by an STS analysis can be mapped by a scanning probe microscope that is attached separately to the STS. For even higher accuracy, the common co-ordinate system given by a rotating spindle on which the storage media are mounted can be used. One requirement for such test technique is that the storage media stationary during both the writing process and the positioning process. Otherwise, the common co-ordinate system between the two measuring schemes will be lost. In other words, any deviation between the center of rotation and the center of the circular data tracks cannot be tolerated. Sometimes, such deviations may even be caused by removing a disk from the spindle and then placing the same disk back on the spindle again. Consequently, data or servo information in the storage media have to be deleted or overwritten by the test mechanism.

However, it is often not very convenient to overwrite additional magnetic information to hard disks because that would change the existing magnetic domains (or magnetic transitions) in the hard disk that might be the cause of performance problems. Another drawback of the above-mentioned overwriting approach is that, in some cases, failures of the magnetic media or magnetic failures can only be detected in a hard disk drive after a servo pattern has been written. Therefore, a nanometer level precision analysis of magnetic media as they come from the hard disk drive are very desirable. A mechanism or tool that is capable of using the existing magnetic transitions, such as the tracks of servo pattern, for exact positioning of the scanning probe is also very desirable.

Another prior art approach relies on magnetic marking techniques and detection of marked areas under an optical microscope. A typical magnetic marking technique is by using a ferrofluidic liquid that is brought on top of the magnetic media. Disadvantages of such approach include additional optical devices and many different analyzing steps are required and time consuming. In addition, not all defects can be found under an optical microscope, especially when no marking techniques are available. Furthermore, ferrofluidic liquid is often destructive to magnetic storage media.

Consequently, it would be desirable to provide an improved method for indexing magnetic storage media.

SUMMARY OF THE INVENTION

In accordance with a preferred embodiment of the present invention, a magnetic disk includes several essentially concentric magnetic tracks. The magnetic disk is attached to a rotating spindle. A number of data tracks is then written in a specific circular arc at an inner radial position of the magnetic disk. The beginning or the end of the written data tracks is defined to be in a co-incident or in a defined relation to an index or trigger signal defined by the rotating spindle. The rotating spindle is stopped from rotation, and a scanning probe microscope is moved radially at a fixed rotating angle to a second radial position. A tip of the scanning probe microscope is moved towards a surface of the magnetic disk. At least one scan line is recorded and analyzed in order to determine if a magnetic track is imaged by the tip of the scanning probe microscope.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
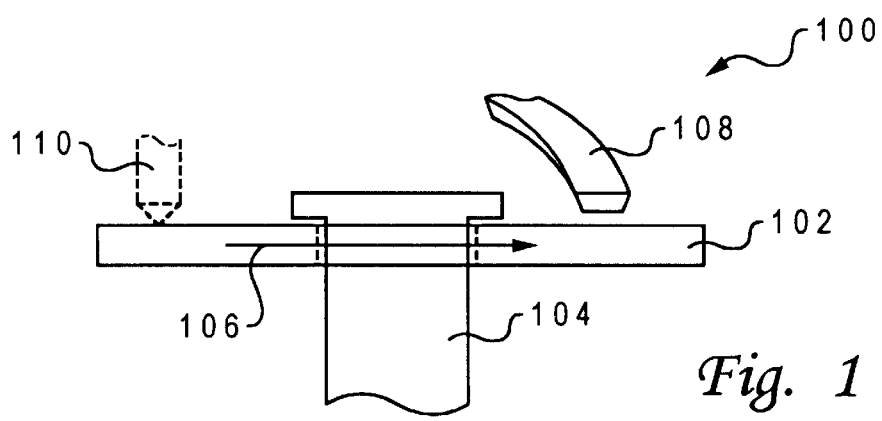
FIG. 1 is a diagram of a spin stand on which a preferred embodiment of the present invention can be used.

Referring now to the drawings and in particular to FIG. 1, there is depicted a diagram of a spin test stand (STS) on which a preferred embodiment of the present invention can be used. As shown, a magnetic disk 102 is rigidly mounted on a rotating shaft (or spindle) 104 of a STS 100. Magnetic disk 102 is shown to spin in the direction of arrow 106. STS 100 also includes a read/write head (or glide head) 108 mounted over magnetic disk 102. The distance between read/write head (RWH) 108 and magnetic disk 102 is in the order of several nanometers. RWH 108 is used to detect specific areas of interest of magnetic disk 102, which includes mechanic lesions of the disk surface or magnetic defects of magnetic layer(s) deposited on top of magnetic disk 102. Those defects can be detected by their disturbation of the magnetic bit information stored on magnetic disk 102. The defects often cause failure to the entire magnetic disk 102, in particular when coinciding with a track of a servo pattern that is required for disk operation of magnetic disk 102 within a hard disk drive.

A scanning probe microscope (SPM) 110, which is indicated by dotted lines, may be attached to STS 100. SPM 110 is used to map defects that have already been detected and localized by the above-described STS analysis. The technique of the above-described STS analysis uses index signals of spindle 104 and partially a magnetic index being written by STS 100 on magnetic disk 102, which allows for high accuracy of the mapping.

Figure 2:
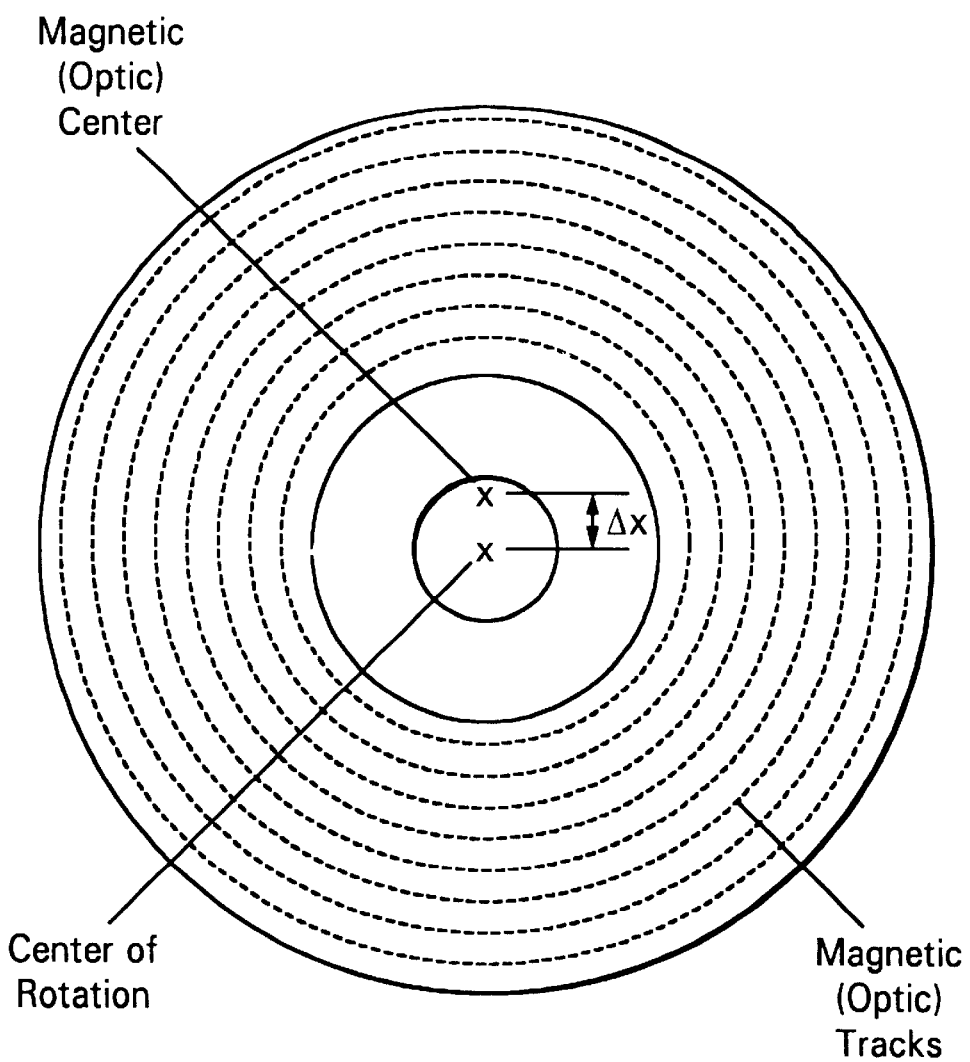
FIG. 2 is an example of eccentric correction of a magnetic or optic disk, in accordance with a preferred embodiment of the present invention.

With reference now to FIG. 2, there is depicted an example of eccentric correction of a magnetic or optic disk, in accordance with a preferred embodiment of the present invention. It is hereby assumed that the magnetic center of the underlying essentially concentric tracks differs from the geometrical center of the magnetic media by a small linear shift x. It should be noted that, in most cases, the geometrical center deviates from the center of the underlying data tracks when a storage media is mounted to a spindle as described above. Thus, by determining the magnetic center of rotation (or tracks) according to the method described infra, the linear shift can be calculated precisely to enable a proper correction, such as a static shift of the disk or by a dynamic or static actuation of a suspension of a hard disk drive.

Figure 3A:
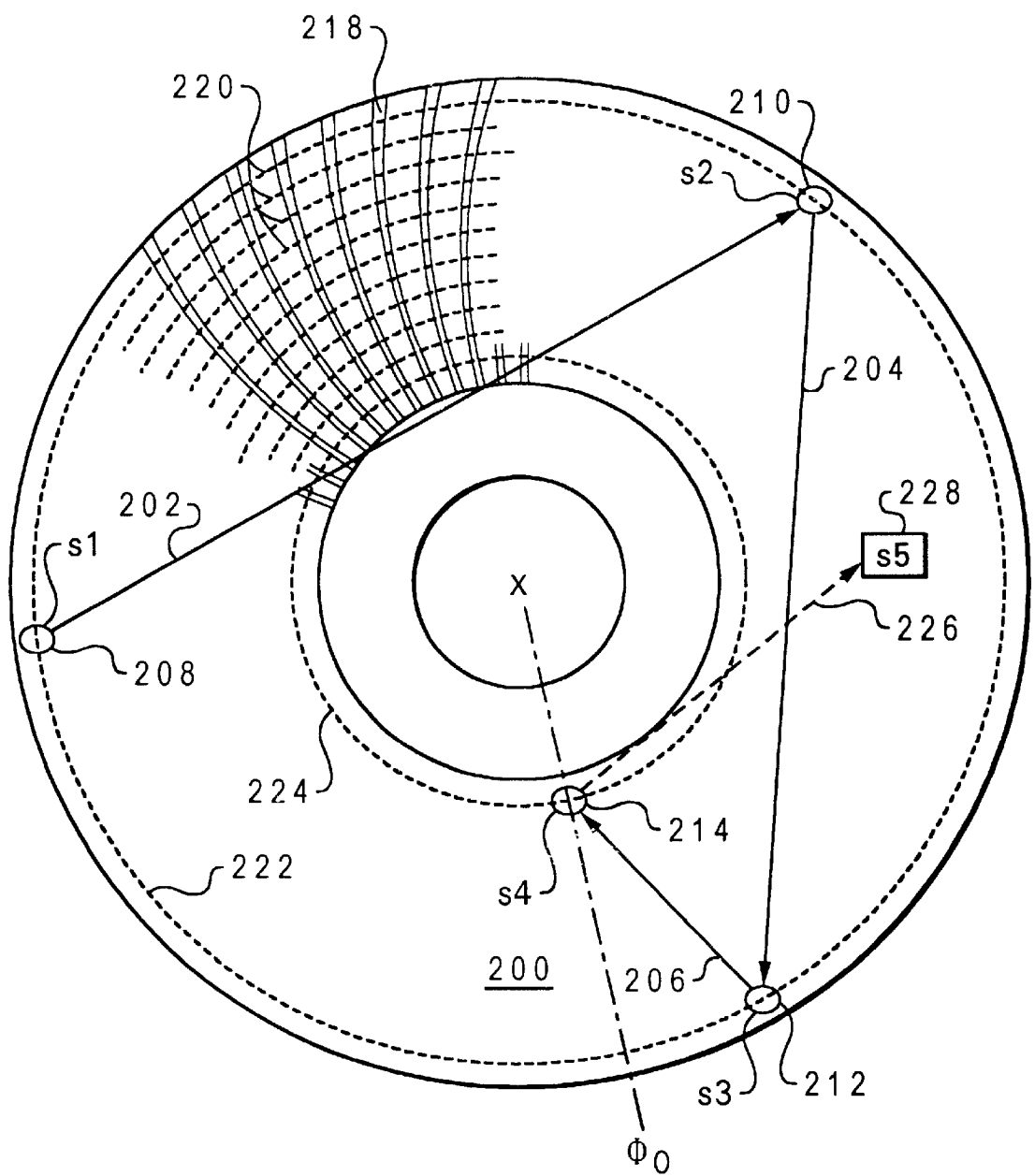
FIGS. 3a–3c are different embodiments for providing a rotational coordinate system on a disk surface, in accordance with a preferred embodiment of the present invention.
Figure 3B:
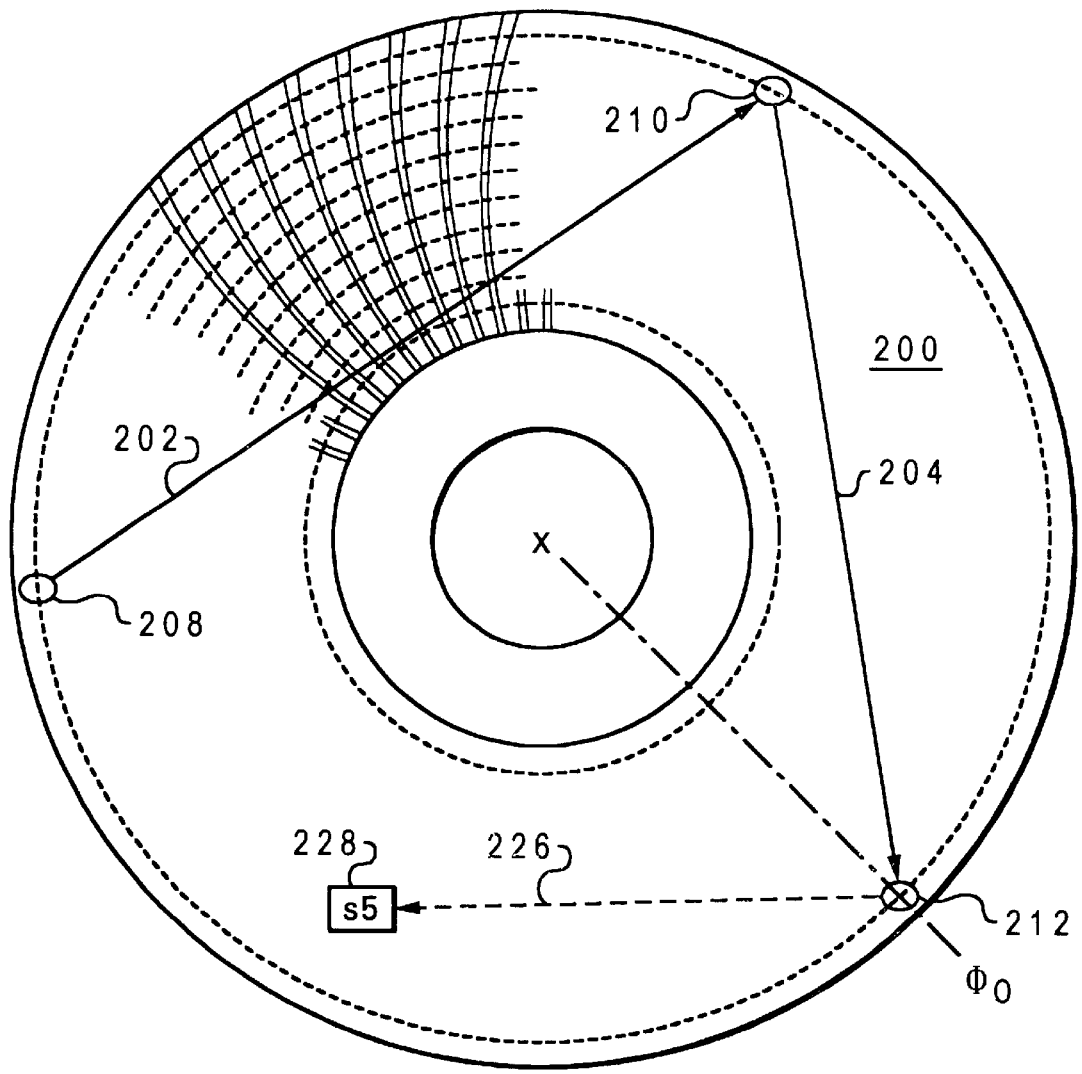
Figure 3C:
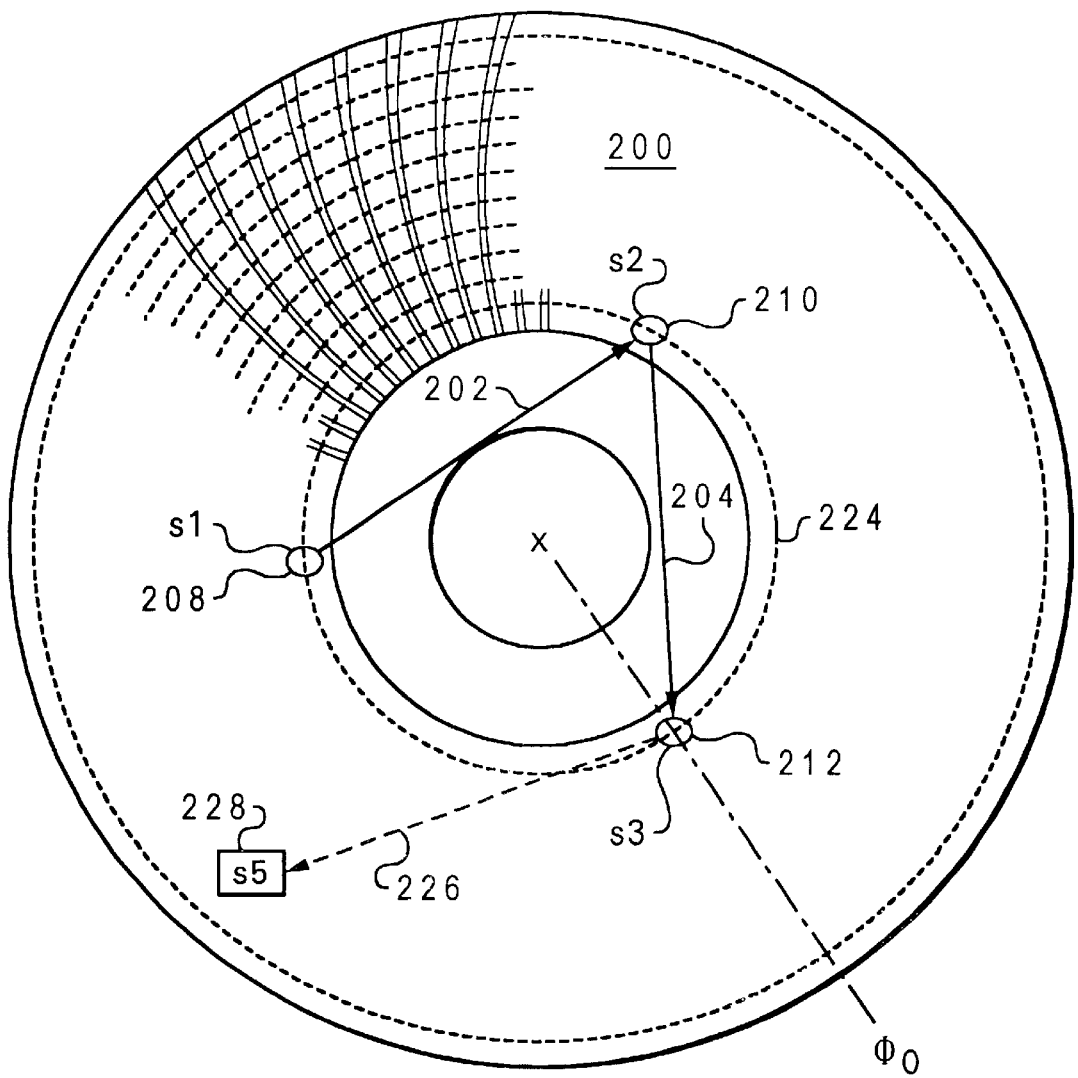

Referring now to FIGS. 3a–3c, there are illustrated different embodiments for providing a rotational co-ordinate system on a disk surface, in accordance with a preferred embodiment of the present invention. The underlying procedure is illustrated by three different top views of a disk 200 in FIGS. 3a–3c, respectively. The following assumptions apply to FIGS. 3a–3c. First, it is assumed that the co-ordinate system is defined by positioning a scanning probe on top of a disk surface along certain paths that are depicted by solid lines 202, 204 and 206, and the associated path nodes (or points), such as 208, 210 and 212, are determined by using two underlying stepper motors (not shown) to provide corresponding position information. Second, it is assumed that disk 200 already includes a magnetic or optic pattern. In the present example, a servo pattern includes essentially concentric tracks 220 having smaller (circle) segments for storing servo information and wider circle segments 218 for storing data.

In the first embodiment depicted in FIG. 3a, the scanning probe is initially positioned on an arbitrary point S1 208 located on an outer track 222 of concentric tracks 220. The detection of outer track 222 can be accomplished by checking the asymmetric neighborhood of outer track 222, i.e., outer track 222 has an adjacent inner track but no adjacent outside track.

Then, the scanning probe is moved along path 202 and positioned again at a second point S2 210 also located on outer track 222. Subsequently, the scanning probe is moved from second point S2 210 to a third point S3 212 located on outer track 222. From the three scan points 208, 210 and 212, the magnetic center of data tracks corresponding to the center of rotation during magnetic information are being written can be calculated using common curve-fitting algorithms that are well-known in the art.

Afterwards, the scanning probe is moved from third point S3 212 to a fourth point S4 214 located anywhere between the most inner track 224 and the most outer possible track 222 of concentric tracks 220. Using fourth point S4 214, a zero-angle position $\Phi_0$ of the cylindric co-ordinate system is defined. The zero-angle can be defined by local data transitions. There are no transitions written at $\Phi_0 \pm \Delta\Phi$. Such a $\Phi_0$ can also be obtained by data transitions vice versa.

It should be noted that fourth point S4 214 is only optional for defining the zero-angle position since the zero-angle position can be also defined using one of the other points S1–S3. Using the previously calculated center of rotation and the defined zero-angle position, the cylindric or rotational co-ordinate system can be well-defined.

At each of points S1–S4 (i.e., 208, 210, 212 and 214), instead of using the position information of the above-mentioned stepper motors, an index can be written to magnetic layer or into the disk surface; thus, enabling the reuse of the defined co-ordinate system on a different test stand or the like. Such indexes can be written by magnetic techniques or by surface modification techniques such as laser melting or scratching. These indexes can also be used for optical or magneto-optical data storage media.

Using the defined co-ordinate system, any position on magnetic disk 200, such as a point S5 at an area of interest 228, can be characterized. Generally speaking, such technique is independent of specific parameters of the underlying media such as disk size, thickness or read/write head geometry, flying height, the fixture design to which the read/write head is mounted and any other specific hardware, electronics (channel) or software requirements and the pre-characterization tool.

The second embodiment shown in FIG. 3b distinguishes from the first embodiment from FIG. 3a insofar as comprising only three points S1, S2 and S3 (i.e., 208, 210 and 212) and point S3 is also used to defined the zero-angle required for the cylindric co-ordinate system. Thus, after having indexed point S3 212, magnetic disk 200 is ready to be probed by additional scans such as point S5 at a defect area 228, which is indicated again by dotted lines 226.

The third embodiment shown in FIG. 3c distinguishes from the first and second embodiments from FIGS. 2a and 2b insofar as the points S1–S3 are not located on most outer track 222 of concentric tracks 220 but on inner track 224. Using inner track 224, instead of outer track 222, has the disadvantage that the co-ordinate system, in particular the center of rotation, cannot be defined as accurately as in the above-mentioned two examples. But, it can be advantageous in cases where the outer track cannot be written into for indexing purposes.

Referring back to FIG. 1, if magnetic disk 102 is clamped to rotating shaft 104 such that the position between magnetic disk 102 and rotating shaft 104 is fixed, an easier procedure for indexing a rotational coordinate system can be conducted. The fixed position between magnetic disk 102 and rotating shaft 104 allows the rotational coordinate system to be kept constant during the writing process. As a result, the procedure for defining the magnetic rotational center can be simplified. Specifically, only one step of locating the position of one defined track is sufficient to determine the magnetic center of rotation, and the steps of locating points S2 210 and S3 212, as depicted in FIGS. 3a–3c, can be eliminated. However, the geometrical center of magnetic disk 102 is still different from the magnetic center of magnetic disk 102 that is defined by the testing process.

Figure 4:
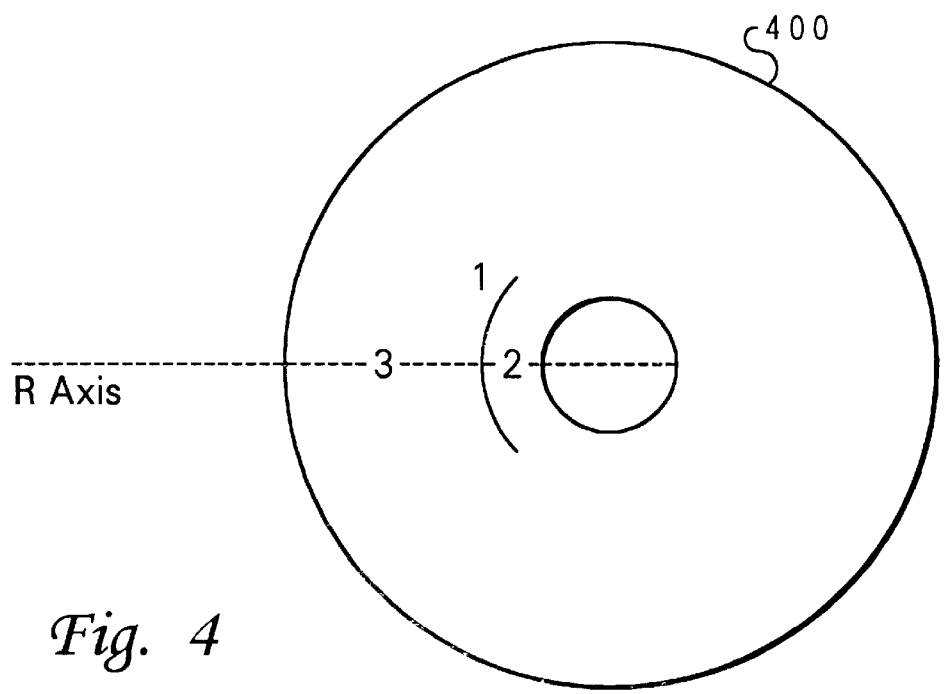
FIG. 4 is a top view of a magnetic disk.

With reference now to FIG. 4, there is illustrated a top view of a magnetic disk for explaining the above-mentioned simplified positioning procedure, in accordance with a preferred embodiment of the present invention. In FIG. 4, a top view of a magnetic disk 400 (single platter) is depicted, and a SPM, such as SPM 110 from FIG. 1, may be used as a magnetic inspection tool. The SPM is operated in a mode where the magnetization status of samples are visualized. The tip of the SPM is rastered scan linewise within a scanning window to record images of a sample, which is magnetic disk 400 is this example (similar to magnetic disk 102 from FIG. 1).

The simplified positioning procedure is performed on magnetic disk 400 as follows. Initially, magnetic disk 400 is mounted to a rotating spindle of an STS. In addition, magnetic disk 400 is clamped to the rotating spindle of the STS during analysis. Then, 50 tracks, for example, are written by the STS for a specific circular arc (such as 1 in FIG. 4) at the inner radius of magnetic disk 400. It is understood that the exact number of written tracks is not of importance, and thus more or less than 50 tracks can be written. The beginning or the ending of the data tracks as seen by the read sensor signal is defined to be in co-instantaneous or in relation to an index or trigger signal defined by the spindle. Such relationship is graphically illustrated in FIG. 5, which shows a time relation between a trigger (index) signal and a sensor signal for positioning magnetic disk 400 attached to the STS.

Next, the spindle rotation is stopped and the analysis tool is moved along the R-axis to a position 2 or position 3 on magnetic disk 400, as shown in FIG. 4. The SPM, operated as a magnetic force microscope (MFM), is powered on and the SPM tip is engaged towards the surface of magnetic disk 400. Then, one line is recorded and the signals obtained by the magnetic imaging technique is recorded. The one line can be analyzed by software or hardware that can decide if a magnetic track was imaged by the scanned tip (R-axis position 2, step n-3 of FIG. 6). This can be done by a data acquisition system using threshold values. The threshold values can be determined from an alternating current (AC) coupled phase shift signal of a vibrating cantilever sensor. The cantilever sensor is vibrating close to its resonance frequency, and the phase signal variations (AC contribution) shift is recorded independently of the static phase signal (DC contribution). In the case shown in FIG. 6 (step n-3), only magnetic information below a threshold value is recorded since the scanning line is not passing the tracks. In the case when there are no tracks detected, the SPM is moved along the R-axis by a defined pitch p (e.g., in 20 microns) further towards the magnetic track (step n-2 of FIG. 6). This process is repeated until a magnetic signal is recorded (step n of FIG. 6). A similar technique can be used when starting at R-axis position 3.

Figure 6:
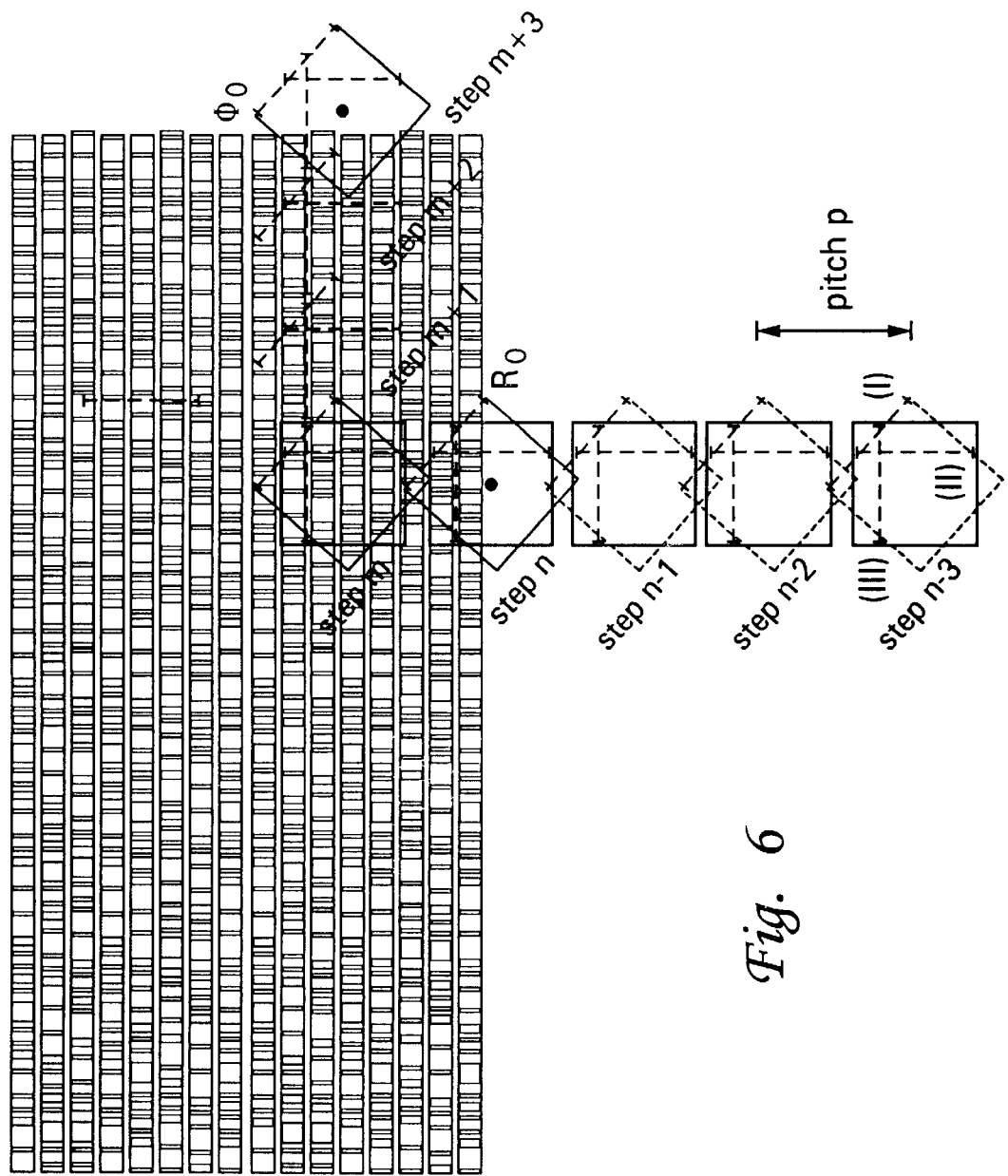
FIG. 6 is a detailed view of magnetic bit patterns of a track on the magnetic disk from FIG. 4.

In the present embodiment, the scanning window is preferably in a quadratic shape, as shown in FIG. 6. In addition, the scanning window is set in an angle (e.g., 45 degrees) from the linear tracks. Within the scanning window, a single scan line (I) is used, which is arranged using an offset relatively to the center of the scanning window. It is note that, in the present embodiment, the starting point or end point of the single scan line is arranged to be closest to the tracks. Other arrangements of the scan line such as scan line (II) or (III) can be used but may not be as error-tolerant under a software algorithm when the tip images areas of equal magnetization (such as in scan line (II)) or may lead to non-precise track finding (such as in scan line (III)). It is emphasized that the slow scan axis of the scanned tip is disabled, and thus only one single line in the raster area is scanned. The scanning window is realized by a probe that is rastered using a fast and a slow scan direction. In the fast direction, the tip is moved along the scan line. In the second slow direction, the tip is moved step by step in order shift the scan line by one unit.

The search algorithm is aborted when a part of the scanned line detects magnetically written tracks (step n of FIG. 6). The software analysis can be specifically adapted to detect only part of the scan line signal obtained in the MFM mode. A first lift mode sequence is used to determine the MFM signal. If no tracks are detected, then a subsequent run in a lift mode is used to move the analysis tool a step forward. In case of an SPM system, this is important because in lift mode in general, the tip is not in contact with a magnetic disk, and hence the possibility for tip damage is minimized. The lift mode and the topography mode can be distinguished by a 5V trigger signal. For example, during a lift mode, a 5V trigger signal is provided, and during a topography mode, a different voltage trigger signal is generated.

Figure 5:
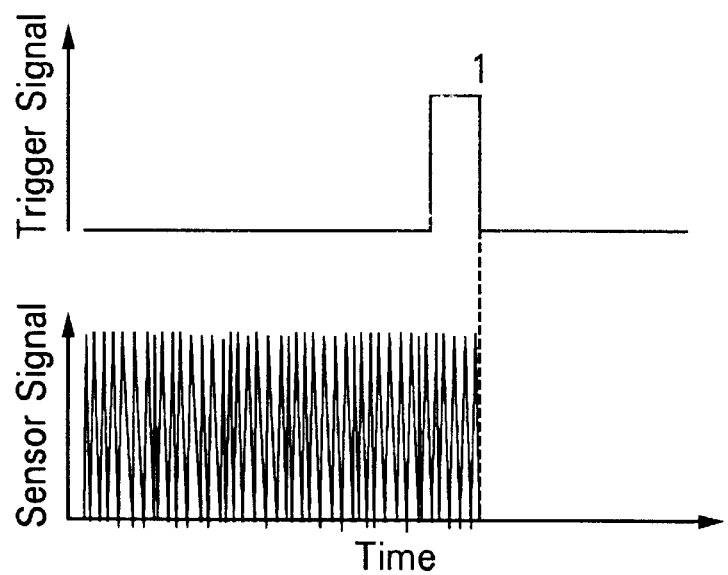
FIG. 5 depicts a time relation between a trigger signal and a sensor signal for positioning a magnetic disk attached to a spin test stand.

When the defined tracks have been located, the movement of the analysis system can be stopped, and the position defines R0. This is shown in step n of FIG. 6. Then, the analysis tool is moved a certain distance further along the R-axis until a magnetic signal arising from the written tracks is recorded in the full image field (step m of FIG. 6) to maximize the recorded magnetic signals. The certain distance is chosen in order to guarantee that the selected scan line is arranged completely within the magnetic tracks. Next, the set-point-angle 0 indicated as '1' in FIGS. 4 and 5 is searched by slowly rotating the spindle. A similar scan setup is used as described above. The spindle is turned in the first scan in a lift mode and the MFM signals are recorded.

In case when magnetic signals are still recorded (step m+1 and step m+2 of FIG. 6), then the spindle is further rotated a small angle. These steps are repeated until the magnetic signal recorded by the analysis system is dropping below the above-mentioned threshold value, i.e., no signals of the tracks are recorded in the scan line (step m+3 in FIG. 6). The step at which the signal declined defines the position of the spindle where a defined angle $\Phi_0$ of the coordinate system is obtained.

Figure 7:
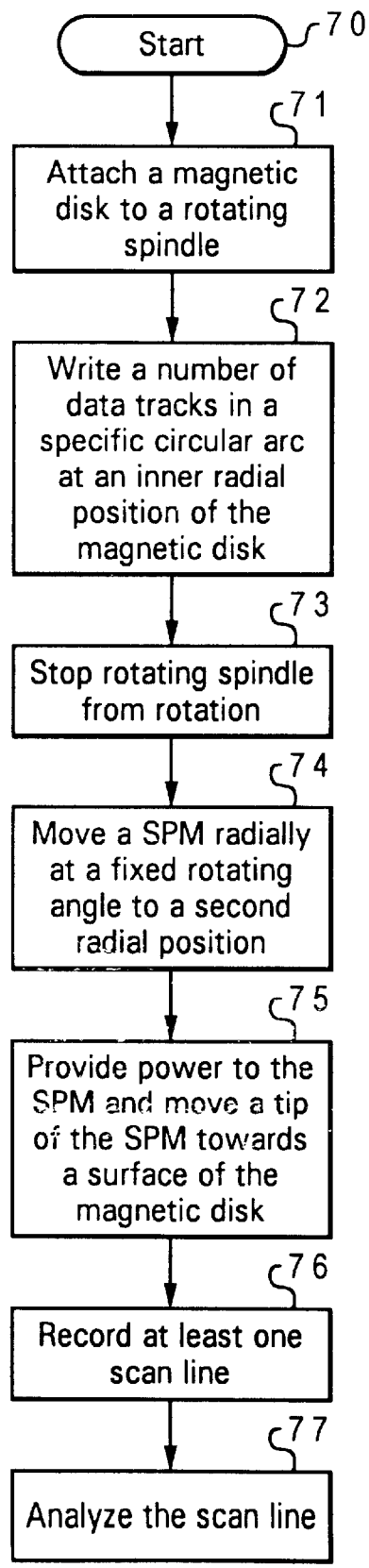
FIG. 7 is a high-level logic flow diagram of a method for indexing magnetic disks by means of a scanning probe.

Referring now to FIG. 7, there is depicted a high-level logic flow diagram of a method for indexing magnetic disks by means of a scanning probe, in accordance with a preferred embodiment of the present invention. Starting at block 70, a magnetic disk is attached to a rotating spindle, as shown in block 71. A number of data tracks is then written in a specific circular arc at an inner radial position of the magnetic disk, as depicted in block 72. The beginning or the end of the written data tracks is defined to be in a coincident or in a defined relation to an index or trigger signal defined by the rotating spindle. The rotating spindle is stopped from rotation, as shown in block 73, and a scanning probe microscope is moved radially at a fixed rotating angle to a second radial position, as depicted in block 74. Power is provided to scanning probe microscope, and a tip of the scanning probe microscope is moved towards a surface of the magnetic disk, as shown in block 75. At least one scan line is recorded, as depicted in block 76, and analyzed in order to determine if a magnetic track is imaged by the tip of the scanning probe microscope, as shown in block 77.

As has been described, the present invention provides a method for indexing a hard disk by means of a scanning probe. The method of the present invention can be implemented in a scanning probe microscope or a corresponding device having a x-y stage for sample or scan head positioning. It is emphasized that a magnetic disk, in contrast to the prior art approaches, must only be fixed on a sample holder when a scanning probe is positioned on the surface of the magnetic disk only by means of two stepper motors, one for the x-direction and the other for the y-direction.

While the invention has been particularly shown and described with reference to a preferred embodiment, it will be understood by those skilled in the art that various changes in form and detail may be made therein without departing from the spirit and scope of the invention.

What is claimed is:

1. A method for indexing a magnetic disk via a scanning probe, said method comprising:

attaching a magnetic disk to a rotating spindle;

writing a number of data tracks in a specific circular arc at an inner radial position of said magnetic disk, wherein a beginning or an end of said written data tracks is defined to be in a co-incident or in a defined relation to an index or trigger signal defined by said rotating spindle;

stopping said rotating spindle from rotation and moving a scanning probe microscope radially at a fixed rotating angle to a second radial position;

providing power to said scanning probe microscope and moving a tip of said scanning probe microscope towards a surface of said magnetic disk;

recording at least one scan line; and analyzing said at least one scan line in order to determine if a magnetic track is imaged by said tip of said scanning probe microscope.

2. The method of claim 1, wherein said recording and said analyzing use threshold values that are determined from an alternating current coupled to a phase shift signal of a vibrating cantilever sensor.

3. The method of claim 1, wherein a quadratic scanning window is scanned in an angle of approximately 45 degree to said data tracks.

4. The method of claim 1, wherein one scan axis of said tip of said scanning probe microscope is enabled, and only one single scan line in a raster area is scanned.

5. The method of claim 4, wherein a start or an end of said single scan line is set to be closest to said data tracks.

6. The method of claim 4, wherein said single scan line is arranged with an offset to a center of said scanning window.

7. The method of claim 1, wherein said method further includes aborting said analyzing step when a part of said scanned scan line detects magnetically written tracks.

8. The method of claim 1, wherein said method further includes running a first lift mode sequence in order to detect a magnetic signal, and running a second lift mode sequence if no tracks are detected in order to move said tip of said scanning probe microscope one step forward.

9. The method of claim 1, wherein method further includes stopping the movement of said tip of said scanning probe microscope if said defined tracks have been located and a current position of said tip of said scanning probe microscope defines $R_0$.

10. The method of claim 9, wherein said method further includes stopping the movement of said rotating spindle if said defined tracks have disappeared and a current position of said rotating spindle defines 0.

11. The method of claim 1, wherein said scanning probe microscope is operated in a mode where a magnetization status of said magnetic disk is visualized.

* * * * *